May 27, 1958 A. GRASSMUCK 2,836,275
CENTRIFUGALLY OPERATED CLUTCH
Filed Aug. 4, 1953 8 Sheets-Sheet 1
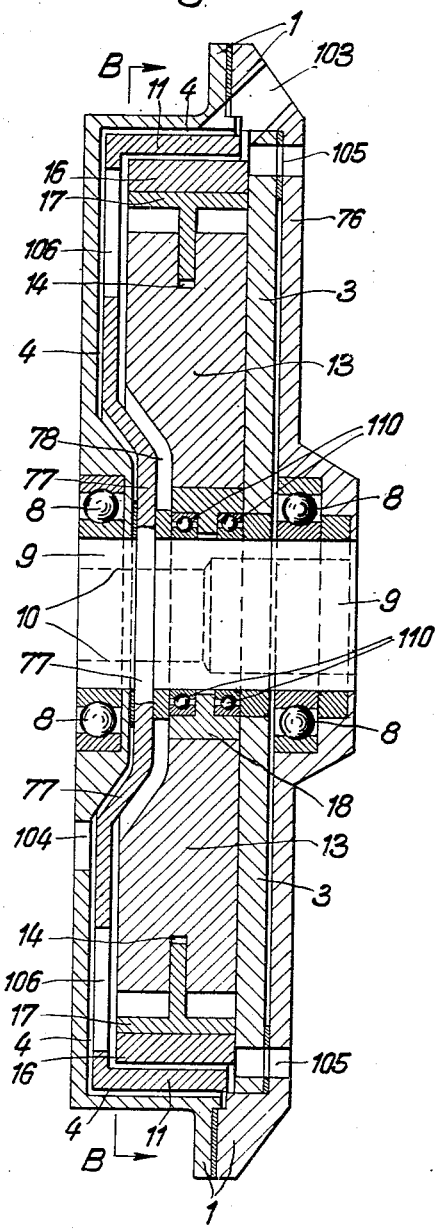
Inventor:
AUGUST GRASSMUCK

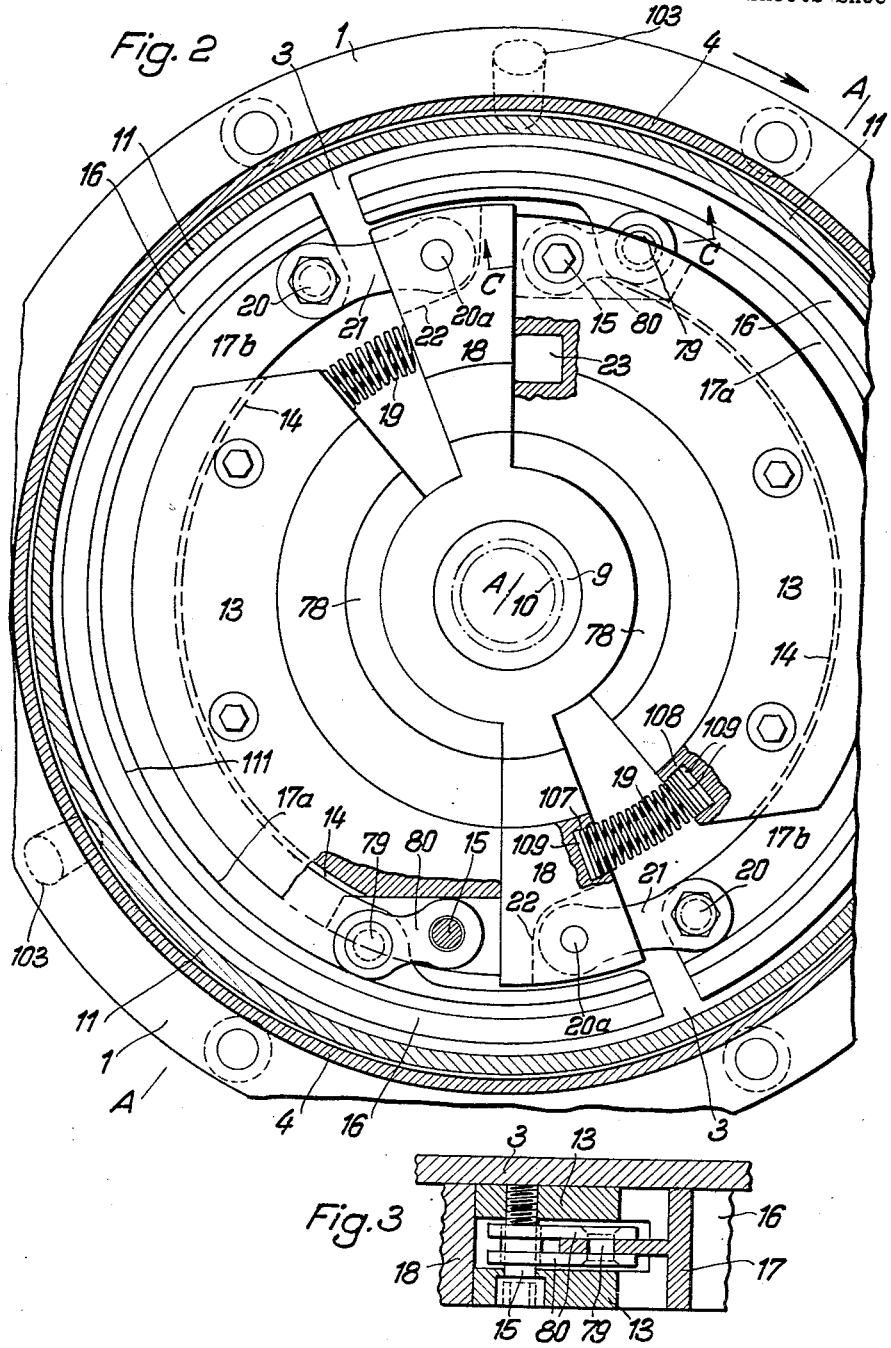

May 27, 1958       A. GRASSMUCK       2,836,275
CENTRIFUGALLY OPERATED CLUTCH
Filed Aug. 4, 1953       8 Sheets-Sheet 3

Inventor:
AUGUST GRASSMUCK
BY

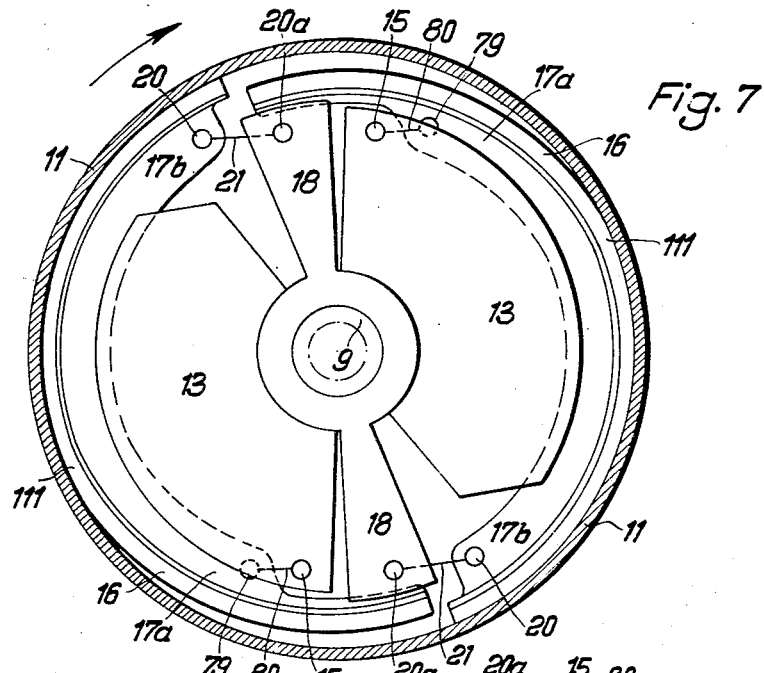
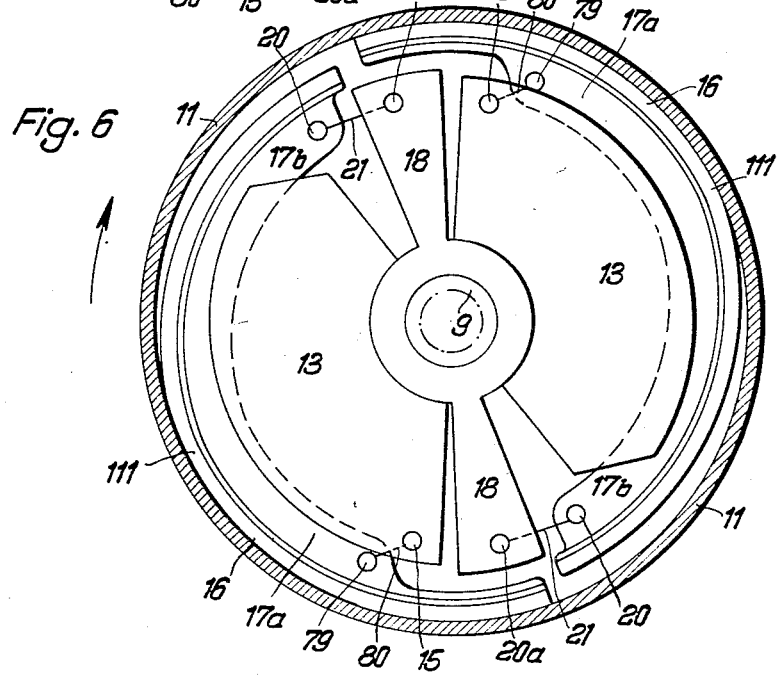

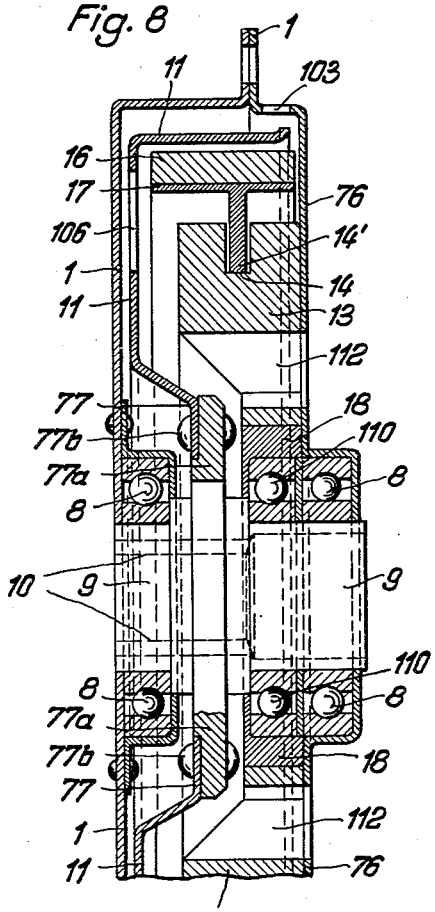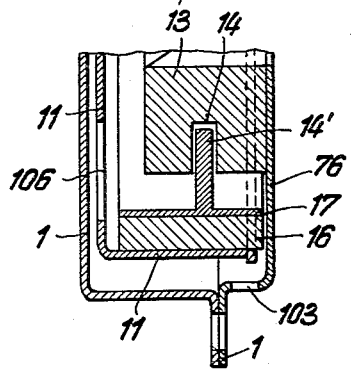

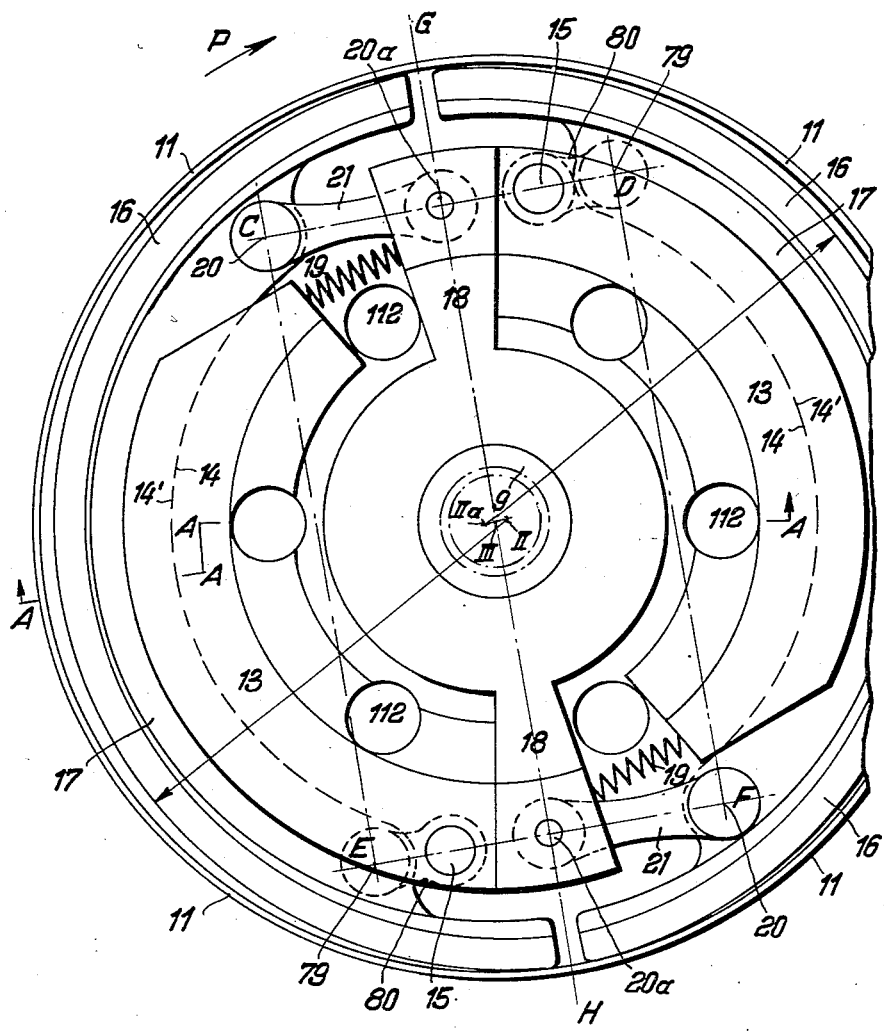

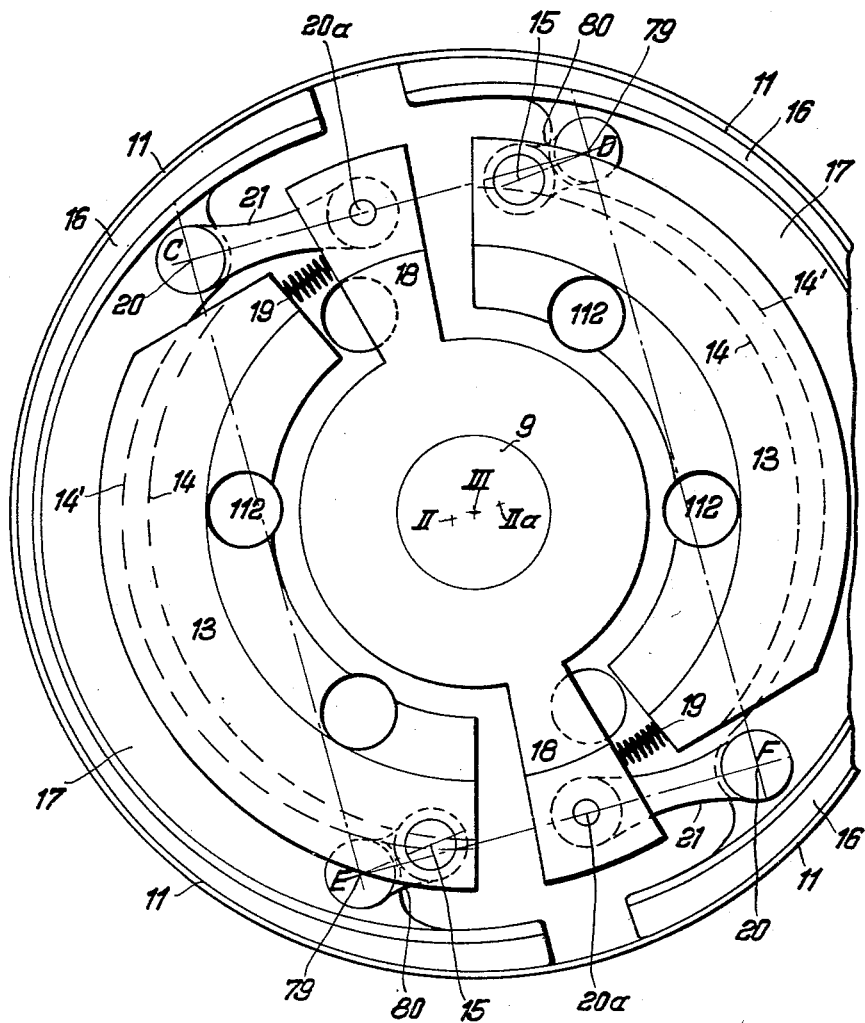

United States Patent Office 2,836,275
Patented May 27, 1958

2,836,275

CENTRIFUGALLY OPERATED CLUTCH

August Grassmuck, Hamburg-Rahlstedt, Germany

Application August 4, 1953, Serial No. 372,331

19 Claims. (Cl. 192—105)

The present invention relates to automatic clutches, such as, for example, clutches suitable for use with automobiles, other driven vehicles, or other motor-driven power transmissions of any type.

One of the objects of the present invention is to provide an exceedingly simple clutch whose outer configuration does not require any modification in structures located adjacent the clutch and which may replace known clutches without modifying the parts associated with these known clutches.

Another object of the present invention is to provide an automatic friction clutch which slips to a very small extent during operation thereof, so that the rate of wear of the clutch is very low.

A further object of the present invention is to provide a fully automatic clutch which is actuated by the speed of rotation of a drive apparatus connected thereto. Thus, when the clutch of the invention is mounted in an automobile or other motor-driven vehicle, the engagement and disengagement of the clutch will be controlled by actuation of the accelerator.

Also, it is an object of the invention to provide a clutch which automatically disconnects the engine from the vehicle to provide a free wheeling effect if no acceleration is required, but, on the other hand, the clutch of the present invention is capable of connecting the motor of the vehicle to the wheels thereof, either automatically or by hand, when the vehicle itself tends to accelerate greatly, as when going down a hill, so that the motor effects a braking of the vehicle. The fulfillment of this last object greatly simplifies the operation of the vehicle, and in particular the requirement to operate the clutch and accelerator in an interdependent manner is avoided.

An additional object of the present invention is to provide a fully automatic clutch which is automatically cooled and which requires no oil.

Still another object of the present invention is to provide an automatic clutch which automatically disconnects the motor from the driven parts of a vehicle, for example, when the motor tends to become overloaded.

Yet another object of the present invention is to provide a clutch which will continue to operate in a satisfactory manner even when friction linings thereof are fully worn so that the vehicle or the like on which the clutch is located may be safely driven to a repair station.

Also, the objects of the present invention include the provision of an automatic clutch which is very easy to disassemble and assemble.

A still further object of the present invention is to provide an automatic clutch capable of accomplishing all of the above objects and at the same time being made up of a relatively small number of simply and ruggedly constructed parts.

With the above objects in view, the present invention mainly consists of an automatic clutch apparatus which includes a substantially cylindrical hollow housing adapted to be connected, for rotation about its axis, to a driving member to be rotated thereby. A shaft having its axis coincident with the axis of the housing is supported thereby for free rotation, this shaft being adapted to be connected to a driven member. A substantially cylindrical drum having its center located in the shaft axis is fixed to the shaft for rotation therewith and is located within the housing, this drum having an inner cylindrical clutch face. A pair of substantially semi-circular clutch members are located next to each other within this drum and extend substantially about the shaft axis, each of these clutch members having an outer clutch face directed toward the inner clutch face of the drum. A two-armed lever is turnably mounted at its center on the shaft for free rotation about the axis thereof and is located within the drum and housing, this lever having opposite free ends located adajcent the clutch members. A pair of links are pivotally connected at one end to each of the clutch members respectively adjacent the opposite ends thereof, and these links are of different lengths. A first connecting means pivotally connects the opposite end of the shorter of each pair of links to the housing for rotation therewith. A second connecting means pivotally connects the opposite ends of the longer links respectively to opposite end portions of the two-armed lever, and a spring means is operatively connected to this lever to urge the same in that direction about the shaft axis which draws the clutch members, through the longer links, away from the inner clutch face of the drum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevational view of a clutch constructed in accordance with the present invention and is taken along line A—A of Fig. 2;

Fig. 2 is a fragmentary sectional view taken along line B—B of Fig. 1 in the direction of the arrows;

Fig. 3 is a fragmentary sectional view taken along the line C—C of Fig. 2 in the direction of the arrows;

Fig. 6 is a diagrammatic illustration of the clutch of the invention in its fully engaged position;

Fig. 7 is a diagrammatic illustration of the clutch of the invention in a position where it connects a motor of the vehicle to the wheels of the latter for braking the vehicle;

Fig. 8 is a fragmentary sectional view of a slightly different embodiment of the present invention taken along line A—A of Fig. 10 in the direction of the arrows;

Fig. 9 is a fragmentary sectional view taken along line B—B of Fig. 11 in the direction of the arrows;

Fig. 10 is a fragmentary partly diagrammatic view of a slightly different embodiment of the present invention, shown in the rest position thereof;

Fig. 12 is the same as Fig. 11 but shows the position of the parts when the friction linings of the clutch members have become worn.

Figure 4:
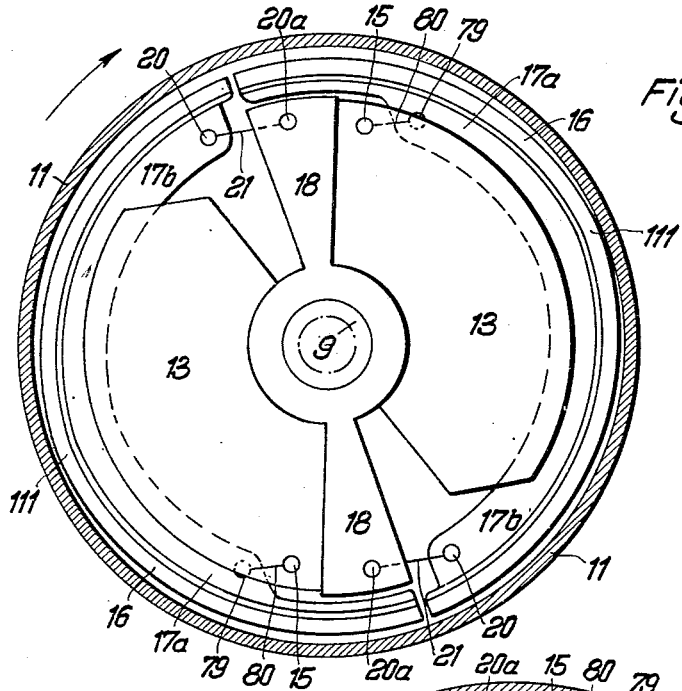
Fig. 4 is a diagrammatic illustration of the clutch of the invention in the disengaged position thereof.

Referring now to the drawings, the clutch of the invention includes a housing 1 which contains all parts of the clutch and which is turnably supported on the hollow shaft 9 through the medium of the ball bearings 8, this hollow shaft 9 being provided with inner teeth 10 adapted to engage a shaft of a driven member and the housing 1 being adapted to be connected to a driving member. As is apparent from Fig. 1, the hollow shaft 9 is fixed to a drum 11 having an inner cylindrical clutch face and being located within the cylindrical housing 1, this drum 11 being, for example, integral with the hollow shaft 9. The drum 11 is therefore freely turnable within the hollow chamber 4 located in the interior of the cylindrical housing 1.

A two-armed lever 18 (Figs. 1 and 2) is carried at its center by ball bearings 110 for free rotation on the hollow shaft 9 within the drum 11 and housing 1, and the arms of this lever 18 are located between a pair of arcuate blocks 13, as shown in Fig. 2, these blocks 13 cooperating with clutch members 17 in a manner described below. The blocks 13 are fixed to a plate 3 located in the housing 1 and being fixed to the end plate 76 thereof, for example, through the medium of screws or the like which are located in the aligned bores 105 of plate 3 and cover 76.

As is apparent from Fig. 1 in particular, the clutch members 17 are of a T-shaped cross section and each have an outer cylindrical peripheral portion located about the axis of shaft 9 and an inner peripheral portion located in a plane normal to shaft 9 and extending freely into a groove 14 formed in block 13. As is shown in Fig. 2, the blocks 13 are both formed with grooves 14 into which inner peripheral portions of the clutch members 17 freely extend. The clutch members 17 are each substantially semi-circular and are located next to each other about shaft 9, as shown in Fig. 2, and each of these clutch members is provided at its outer periphery with a lining 16 of slip-resistant material similar to a brake shoe, this lining 16 of each clutch member 17 being directed toward the inner cylindrical clutch face of drum 11. Each clutch member 17 in fact extends on opposite sides of its central portion 111 along two separate circular arcs having a radius substantially equal to the radius of cylindrical drum 11 so as to provide each clutch member 17 with a pair of arcuate portions 17a and 17b located on opposite sides of the central portion 111 where these two arcuate portions smoothly merge into each other.

A pair of links 21 and 80 are pivotally connected to each clutch member 17 adjacent opposite ends thereof, respectively, by the pivots 20 and 79, respectively, one of the pivots 79 being shown in Fig. 3. These links are parallel to each other and the link 21 is longer than the link 80. The links 80 are connected at one end by the pivots 79 to portions 17a of clutch members 17, respectively, and are pivotally connected at their opposite ends to blocks 13, respectively, by the pivots 15, the details of one of these pivots being shown in Fig. 3, each block 13 being provided with a cutout to receive link 80.

The links 21 which are pivotally connected to portions 17b of clutch members 17, respectively, are also pivotally connected by pivots 20a to the arms of lever 18 adjacent the free ends thereof, as shown in Fig. 2, this lever being provided with cutouts 22 to receive the links 21. This arrangement of the links 21 in cutouts of lever 18 provides a very compact construction, and the compactness of the entire clutch is further promoted by cutouts 78 of blocks 13 into which a dished central part 77 of drum 11 extends, as shown in Fig. 1.

The lever 18 is urged to the position shown in Fig. 2 by a pair of springs 19 which resist turning of lever 18 in a counterclockwise direction, as viewed in Fig. 2, so that a gradual contact between the clutch members 17 and inner clutch face of drum 11 is assured. Each spring 19 extends at one end thereof into a recess 108 of one of the blocks 13 and at the opposite end thereof into a recess 107 of one of the arms of lever 18. The force of springs 19 is carefully chosen to correspond to the speed of rotation of the motor with which the clutch is to be used, but it is also possible, in accordance with the invention, to adjust the force of springs 19 by locating a suitable number of discs 109 in the recesses 107 and 108, as shown in Fig. 2, so that the springs 19 may be compressed to a greater or lesser extent.

A damping means for damping the return movement of lever 18 to the position shown in Fig. 2 when the clutch is disengaged may take the form of shock absorbers 23 mounted on blocks 13, as shown in Fig. 2, these shock absorbers, for example, being in the form of rubber blocks mounted in suitable recesses of blocks 13.

Upon removal of the end plate 76 from the housing 1, it is a simple matter to slip the plate 3 together with blocks 13, links 21 and 80, clutch members 17, and lever 18 out of the housing 1 so that the assembly and disassembly of the clutch, for example during repair thereof, may be quickly and easily carried out.

As was mentioned above, the plate 3 may be omitted, and in this case the blocks 13 are fixed to cover 76 to which the pivots 15 would also be fixed so that with such a construction the blocks 13, links 21 and 80, clutch members 17, and lever 18 would be removable from the apparatus together with the end plate 76. Such a construction is shown in Fig. 8.

If desired, the housing 1 may be provided with openings 103 and 104 and the drum 11 may be provided with openings 106, as shown in Fig. 1, so that air may have access to the interior of the clutch to cool the latter.

The above-described automatic clutch apparatus operates as follows:

Various operating positions of the clutch are illustrated diagrammatically in Figs. 4–7 where the arrow indicates the direction of rotation of housing 1 which is connected to a driving member such as, for example, the flywheel of the motor of an automobile or the like. This rotation of the housing 1 causes the clutch members 17 to rotate in the same direction as a result of their connection through links 80 with the pivots 15 which are fixed to the housing to rotate therewith.

Figure 5:
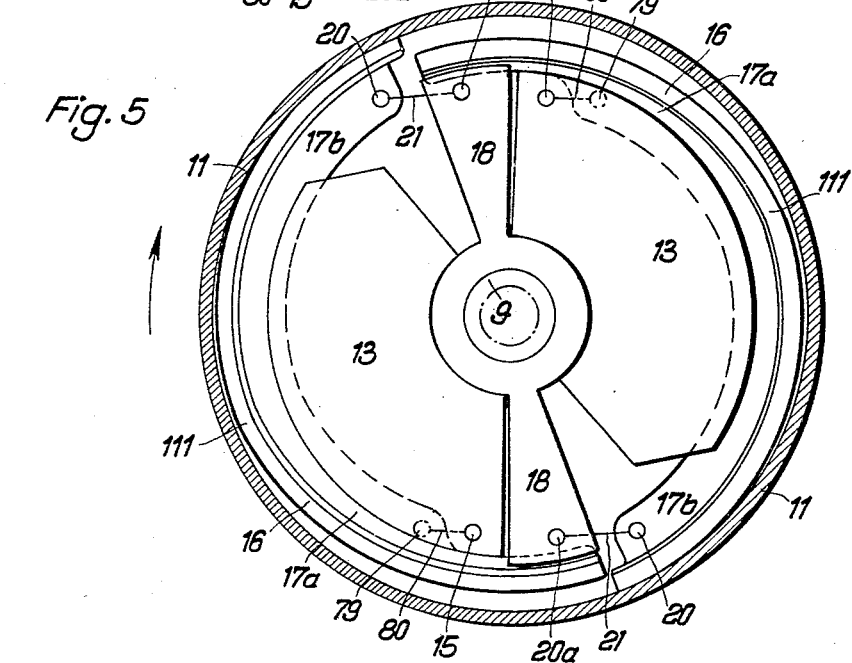
Fig. 5 is a diagrammatic illustration of the clutch of the invention during the engagement thereof.

The clutch members then turn outwardly, by centrifugal force, toward the inner clutch face of drum 11 which remains stationary at the start of the rotation of housing 1 and which is connected through the hollow shaft 9 with a driven shaft connected, for example, to the drive wheels of an automobile. This outward movement of clutch members 17 by centrifugal force causes the links 80 to turn outwardly about the pivots 15 fixed to the blocks 13 which are in turn fixed to the housing 1 for rotation therewith, while the links 21 turn two-armed lever 18 about the hollow shaft 9. As a result of this movement, the clutch members 17 move out of their rest position, where they extend substantially along a circle, as shown in Fig. 4, toward their operating position, and at this early part of the operation of the clutch, the clutch members 17 turn about pivots 79 of links 80 to locate the clutch portions 17b against the inner clutch face of drum 11, as shown in Fig. 5. Fig. 5 also shows grooves in the end faces of lever 18 into which inner peripheral parts of clutch members 17 may freely extend.

As the speed of rotation of the motor and housing 1 increases, the clutch portions 17b move and roll along the inner clutch face of drum 11 until the resistance of the stationary drum 11 is overcome, the central portion 111 of the clutch members 17 then being pressed against the inner clutch face of drum 11 so that the latter starts to rotate. At this instant the portions 17a of the clutch members 17 move into engagement with the inner clutch face of drum 11 and becomes pressed against the latter to a constantly increasing extent until finally all parts turn at the same speed. In this way any slip in the clutch is avoided and the clutch becomes fully engaged, the parts then being in the position shown in Fig. 6.

The disengagement of the clutch takes place with the reverse of the above-described operations when the speed of rotation of the motor decreases. When the motor slows down the turning speed of housing 1 also decreases so that this housing is held back by the motor with respect to the drum 11. Thus, the clutch members 17 are also held back in this way, and moreover the centrifugal force also decreases with decreasing speed of the motor and clutch housing. The vehicle or the like is still travelling at its relatively higher speed and continues therefore to rotate the driven shaft at a relatively high speed so that this driven shaft and the drum 11 suddenly resist slowing up of the motor. The opposition of the forces derived at this time from the slowed up motor and relatively rapidly rotating driven shaft causes the clutch members to be pressed against the inner clutch face of drum 11 to a gradually decreasing extent until only a small part of the portions 17a adjacent central portions 111 of clutch members 17 engages the drum 11. At this instant the clutch members 17 rock in the opposite direction about central portions 111 thereof to locate portions 17b of the clutch members against the inner face of drum 11 and the frictional engagement between these parts causes these clutch portions 17b to be automatically pressed against drum 11 so that the motor turning at the lower speed of rotation acts as a brake on the vehicle, the parts then being in the position shown in Fig. 7. When the speed of the vehicle decreases approximately to a speed corresponding to the speed of the motor, the engagement between the clutch members and drum 11 automatically is released and the clutch members 17 are then returned to their rest position by springs 19, this rest position being shown in Fig. 4.

Figure 11:
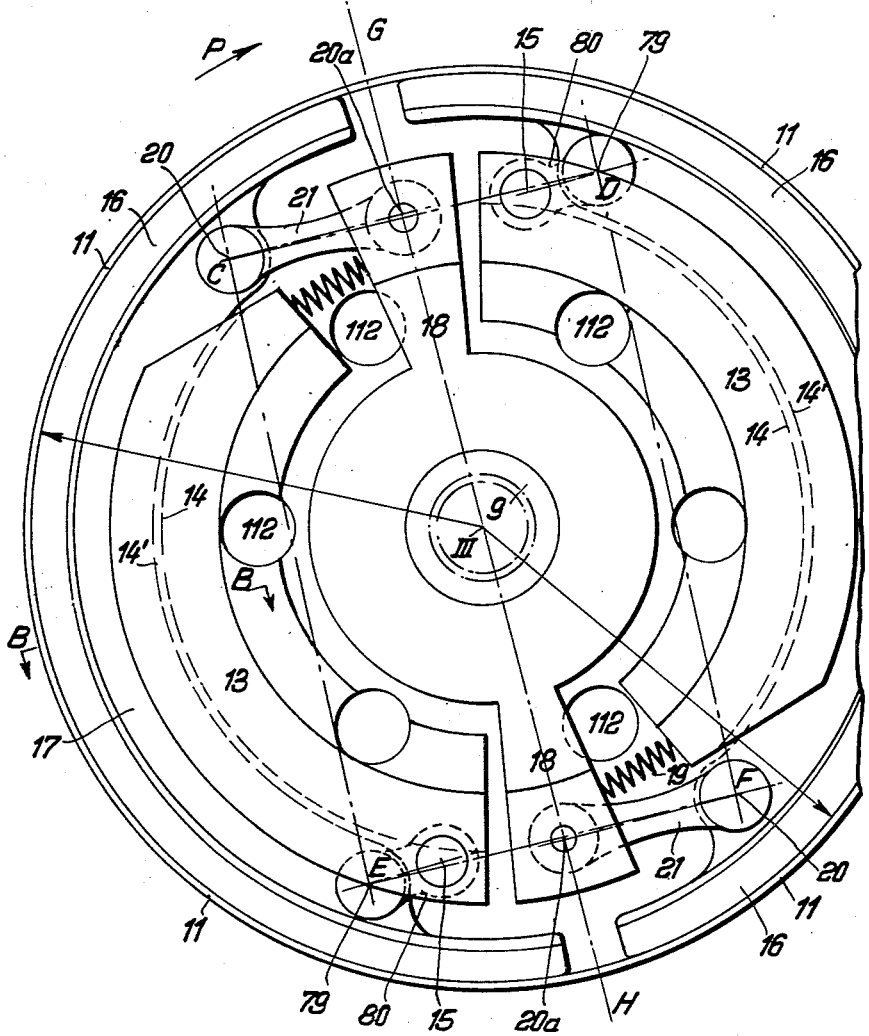
Fig. 11 shows the structure of Fig. 10 in the operating position thereof.

Figs. 8–12 illustrate a slightly different embodiment of the invention according to which the pivot axes of pivots 20, 20a, 15 and 79 of each pair of links 21 and 80 which are located adjacent to each other are arranged, in a plane normal to these axes, along straight lines CD and EF, the pivot axes 20 and 79 forming corners of a rectangle in this plane. As is shown in Fig. 10, the center of curvature III of the cylindrical drum 11 is not coincident with the centers of curvature II and IIa of the clutch members 17' which in this embodiment are curved differently from clutch members 17. When the linings 16 of clutch members 17' are not worn, the centers of curvature II and IIa move into coincidence with the center of curvature III when the clutch members 17' press against the drum 11 during movement of these clutch members into their fully engaged position, as is shown in Fig. 11. As the linings 16 become worn, these centers of curvature II and IIa move outwardly beyond center of curvature III when the clutch moves to its fully engaged position, as may be seen from Fig. 12.

As is shown in Fig. 10, in the rest position of this clutch, the clutch members 17' are symmetrically located on opposite sides of the central line GH passing through the axes of pivots 20a of links 21. During operation of the clutch, these links 21 turn and shifted somewhat due to the movement of the two-armed lever 18, in the manner described above.

The arrangement of Figs. 8–12 guarantees that the clutch members 17' will engage drum 11 along their entire length during operation of the clutch even if the linings 16 are worn away to a great extent. As a result of this frictional engagement of the entire length of clutch members 17' with drum 11, the clutching force is increased and also heat resulting from friction is uniformly distributed. Also, the wear of the clutch members is reduced and more uniform. Even when the linings 16 are almost completely worn away, slip of the clutch members is almost completely avoided. When the linings 16 are fully worn away the uniformity of the clutching action and the freedom from slip is not so great, but in spite of this fact the apparatus still operates satisfactorily so that the vehicle can be safely driven to a repair station where new slip-resistant linings may be provided.

As may be seen from Figs. 8 and 9, the parts 14' of the clutch members 17 rest on the bottom of the grooves 14 of blocks 13 when the apparatus is in its rest position, as shown in Figs. 8 and 10, and in the operating position these parts 14' are spaced from the bottom of grooves 14, as is shown in Figs. 9 and 11. As was mentioned above, the blocks 13 may be directly fastened to the cover plate 76 of the housing 1, through the medium of rivets, screws and the like, for example, and this arrangement is shown in Figs. 8 and 9.

In order to simplify the manufacture and changing of the drum 11 with its central part 77, these parts may advantageously be made of two pieces which are fixed together by rivets or the like.

In order to obtain good cooling and saving of material, several bores 112 may be provided in blocks 13 and cover 76, as shown in Figs. 8–12.

With the above-described apparatus, the following advantages are obtained:

The clutch of the invention may quickly and easily replace known clutches of all types of vehicles and stationary installations. It is only necessary to fit the clutch of the invention to the flywheel of the motor. The clutch of the invention has the same size as known clutches. Since the above-described clutch is fully automatic, clutch control apparatus and a clutch pedal, in particular, are unnecessary so that people who do not have the use of both legs may operate a vehicle with the apparatus of the invention and so that the confidence of vehicle operators in traffic is increased.

The rotating clutch of the invention is completely dry, requires no attention or lubrication and after installation works in such a way that no adjustments or mechanical changes are necessary.

The apparatus of the invention cooperates with the motor in such a way that full use of the motor output is obtained. The motor is entirely separated from the driven parts through the clutch of the invention so that it is much easier to start the motor when it is cold and the load on the battery as well as on the starter is greatly reduced which promotes easy starting of the motor. Also, the motor cannot be overloaded so that no sounds of a laboring motor occur with the clutch of the invention.

When the motor runs with the clutch of the invention disengaged, it is possible, without any grinding of gears, to set the speed transmission at any desired speed position since the motor is automatically separated from the driven parts when the clutch is engaged.

The clutch of the invention becomes automatically engaged when the motor speed is increased. Therefore it is impossible to overload the motor because with an overload the clutch becomes automatically disengaged. For this reason it is impossible to stall the motor of an automobile or the like even when the gear shift lever is out of its neutral position. Moreover, tthe automatic clutch of the invention provides a considerable saving in fuel.

The clutch of the invention is of particular advantage in city traffic since it is only necessary to operate the accelerator and foot brake. For this reason a comfortable, easy operation of the vehicle is assured. When the vehicle stops, it is unnecessary to move the gear shift lever into the neutral position. Also, while the vehicle is stopped the gear shift lever can be moved into any desired speed position and in this way a fast start of the vehicle is provided.

The automatic clutch of the invention also provides a smooth start of the vehicle and is unaffected by the conditions of the ground and by the particular speed position of the transmission. Danger from skidding on wet or icy streets is also lessened with the clutch of the invention. This result is produced because the motor is not separated from the wheels at the instant the brake is applied.

Also, the clutch of the invention, through its capability of braking the vehicle with the motor, permits the foot-operated brakes to be saved and to last for a much longer time.

Wear of the slip-resistant linings of the clutch of the invention is very low. In an actual test where the clutch of the invention was used in a vehicle that traveled over 25,000 km. on city and country roads as well as highways, the amount of wear of the slip-resistant linings was hardly measurable.

It is to be understood that the automatic clutch of the invention is not limited to use with vehicles. The automatic clutch of the invention may be advantageously used in any installation where a large power transmission is required.

It will be understood that each of the elements described above, or two or more together, may also find a useful application in other types of clutches differing from the types described above.

While the invention has been illustrated and described as embodied in fully automatic clutches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Automatic clutch apparatus comprising, in combination, a substantially cylindrical hollow housing adapted to be connected to a driving member to be rotated thereby; a substantially cylindrical drum turnably mounted for free rotation about its axis in said housing and being adapted to be connected to a driven member, said drum having an inner cylindrical clutch face; a pair of substantially semicircular clutch members located next to each other within said drum and extending substantially about the axis thereof, each of said clutch members having an outer clutch face directed toward said inner clutch face of said drum; a pair of links pivotally connected at one end to each of said clutch members respectively adjacent the opposite ends thereof and being of different lengths; first support means located in said housing and connecting the shorter of each pair of links at the opposite end thereof to said housing for rotation therewith; second support means supporting the longer of each pair of links at the opposite end thereof for movement about the drum axis, the longer of each pair of links having the pivotal connection of said opposite end thereof to said second support means located at a lesser radial distance from said drum axis than the pivotal connection of said one end thereof; and spring means acting on said second support means for urging said clutch members away from said clutch face.

2. Automatic clutch apparatus comprising, in combination, a substantially cylindrical hollow housing adapted to be connected to a driving member to be rotated thereby; a substantially cylindrical drum turnably mounted for free rotation about its axis in said housing and being adapted to be connected to a driven member, said drum having an inner cylindrical clutch face; a pair of substantially semicircular clutch members located next to each other within said drum and extending substantially about the axis thereof, each of said clutch members having an outer clutch face directed toward said inner clutch face of said drum; a pair of links pivotally connected at one end to each of said clutch members respectively adjacent the opposite ends thereof and being of different lengths; support means located in said housing, pivotally supporting the opposite ends of said links and connecting the shorter of each pair of links at said opposite end thereof to said housing for rotation therewith, so that said clutch members are suspended by said links from said support means for free movement under the action of centrifugal force into clutching engagement with said drum; and means operatively connected to said opposite ends of said shorter links for adjusting the radial distance of said opposite ends of said shorter links from said drum axis.

3. Automatic clutch apparatus comprising, in combination, a substantially cylindrical hollow housing adapted to be connected to a driving member to be rotated thereby; a substantially cylindrical drum turnably mounted for free rotation about its axis in said housing and being adapted to be connected to a driven member, said drum having an inner cylindrical clutch face; a pair of substantially semicircular clutch members located next to each other within said drum and extending substantially about the axis thereof, each of said clutch members having an outer clutch face directed toward said inner clutch face of said drum; a pair of links pivotally connected at one end to each of said clutch members respectively adjacent the opposite ends thereof and being of different lengths, the shorter of each pair of links connected to one of said clutch members being located adjacent to the longer of each pair of links connected to the other of said clutch members; and support means located in said housing and pivotally supporting the opposite ends of said links in a position where the pivot axes of each of said shorter links and the longer link located adjacent thereto are located along a straight line when the clutch is disengaged; said support means connecting said opposite end of each of said shorter links to said housing for rotation therewith, so that said clutch members are suspended by said links from said support means for free movement under the action of centrifugal force into clutching engagement with said drum.

4. Automatic clutch apparatus comprising, in combination, a substantially cylindrical hollow housing adapted to be connected to a driving member to be rotated thereby; a substantially cylindrical drum turnably mounted for free rotation about its axis in said housing and being adapted to be connected to a driven member, said drum having an inner cylindrical clutch face; a pair of substantially semicircular clutch members located next to each other within said drum and extending substantially about the axis thereof, each of said clutch members having an outer clutch face directed toward said inner clutch face of said drum; a pair of links pivotally connected at one end to each of said clutch members respectively adjacent the opposite ends thereof and being of different lengths, the shorter of each pair of links connected to one of said clutch members being located adjacent to the longer of each pair of links connected to the other of said clutch members; and support means located in said housing and pivotally supporting the opposite ends of said links in a position where the pivot axes of each of said shorter links and the longer link located adjacent thereto are located along a straight line when the clutch is disengaged, and the pivot axes of said one ends of said links forming in a plane normal to the latter pivot axes the corners of a rectangle when the clutch is disengaged, said support means connecting said opposite end of each of said shorter links to said housing for rotation therewith, so that said clutch members are suspended by said links from said support means for free movement under the action of centrifugal force into clutching engagement with said drum.

5. Automatic clutch apparatus comprising, in combination, a substantially cylindrical hollow housing adapted to be connected, for rotation about its axis, to a driving member to be rotated thereby; a shaft having its axis coincident with the axis of said housing and being supported in the latter for free rotation, said shaft being adapted to be connected to a driven member; a substantially cylindrical drum having its center located in said shaft axis, being fixed to said shaft for rotation therewith, and being located within said housing, said drum having an inner cylindrical clutch face; a pair of substantially semicircular clutch members located next to each other within said drum and extending substantially about said shaft axis, each of said clutch members having an outer clutch face directed toward said inner clutch face of said drum; a two-armed lever turnably mounted at its center on said shaft for free rotation about the axis thereof, being located within said drum and housing, and having opposite free ends located adjacent said clutch members; a pair of links pivotally connected at one end to each of said clutch members respectively adjacent the opposite ends thereof and being of different lengths; first connecting means pivotally connecting the opposite end of the shorter of each pair of links to said housing for rotation therewith; second connecting means pivotally connecting the opposite ends of the longer links respectively to opposite end portions of said two-armed lever; and spring means operatively connected to said two-armed lever for urging the same in that direction about said shaft axis which draws said clutch members, through said longer links, away from said inner clutch face of said drum.

6. Automatic clutch apparatus comprising, in combination, a substantially cylindrical hollow housing adapted to be connected, for rotation about its axis, to a driving member to be rotated thereby; a shaft having its axis coincident with the axis of said housing and being supported in the latter for free rotation, said shaft being hollow and being formed with inner teeth so as to be adapted to be connected to a driven member; a substantially cylindrical drum having its center located in said shaft axis, being fixed to said shaft for rotation therewith, and being located within said housing, said drum having an inner cylindrical clutch face; a pair of substantially semicircular clutch members located next to each other within said drum and extending substantially about said shaft axis, each of said clutch members having an outer clutch face directed toward said inner clutch face of said drum; a two-armed lever turnably mounted at its center on said shaft for free rotation about the axis thereof, being located within said drum and housing, and having opposite free ends located adjacent said clutch members; a pair of links pivotally connected at one end to each of said clutch members respectively adjacent the opposite ends thereof and being of different lengths; first connecting means pivotally connecting the opposite end of the shorter of each pair of links to said housing for rotation therewith; second connecting means pivotally connecting the opposite ends of the longer links respectively to opposite end portions of said two-armed lever; and spring means operatively connected to said two-armed lever for urging the same in that direction about said shaft axis which draws said clutch members, through said longer links, away from said inner clutch face of said drum.

7. Automatic clutch apparatus comprising, in combination, a substantially cylindrical hollow housing adapted to be connected, for rotation about its axis, to a driving member to be rotated thereby; a shaft having its axis coincident with the axis of said housing and being supported in the latter for free rotation, said shaft being adapted to be connected to a driven member; a substantially cylindrical drum having its center located in said shaft axis, being fixed to said shaft for rotation therewith, and being located within said housing, said drum having an inner cylindrical clutch face; a pair of substantially semicircular clutch members located next to each other within said drum and extending substantially about said shaft axis, each clutch member having a T-shaped cross section, having an outer peripheral portion located substantially along a cylinder extending about said shaft axis, and having an inner peripheral portion located in a plane normal to said shaft axis, and each clutch member having a slip-resistant lining fixed to said outer peripheral portion thereof and directed toward said inner clutch face of said drum; a two-armed lever turnably mounted at its center on said shaft for free rotation about the axis thereof, being located within said drum and housing, and having opposite free ends located adjacent said clutch members; a pair of links pivotally connected at one end to each of said clutch members respectively adjacent the opposite ends thereof and being of different lengths; a pair of blocks fixed to said housing for rotation therewith, being located within said drum, and having outer peripheral portions formed with grooves into which said inner peripheral portions of said clutch members freely extend, respectively; first connecting means pivotally connecting the opposite end of the shorter of each pair of links to said blocks, respectively; second connecting means pivotally connecting the opposite ends of the longer links respectively to opposite end portions of said two-armed lever; and spring means engaging said blocks and said two-armed lever for urging the latter in that direction about said shaft axis which draws said clutch members, through said longer links, away from said inner clutch face of said drum.

8. Automatic clutch apparatus comprising, in combination, a substantially cylindrical hollow housing adapted to be connected to a driving member to be rotated thereby; a substantially cylindrical drum turnably mounted for free rotation about its axis in said housing and being adapted to be connected to a driven member, said drum having an inner cylindrical clutch face; a pair of substantially semicircular clutch members located next to each other within said drum and extending substantially about the axis thereof, each of said clutch members having an outer clutch face directed toward said inner clutch face of said drum, and each clutch member extending in opposite directions from a central portion thereof respectively along different circular arcs smoothly merging into each other at said central portion; a pair of links pivotally connected at one end to each of said clutch members respectively adjacent the opposite ends thereof and being of different lengths; and support means located in said housing, pivotally connecting the opposite ends of the shorter of said links to said housing for rotation therewith, so that said clutch members are suspended by said links from said support means for free movement under the action of centrifugal force into clutching engagement with said drum and a double armed lever turnably mounted for rotation about an axis coaxial with the axis of said drum pivotally supporting the opposite ends of the longer of said links and spring means resiliently biasing said double armed lever in a direction of rotation to move said clutch members through said longer links away from the inner clutch face of said drum.

9. Automatic clutch apparatus comprising, in combination, a substantially cylindrical hollow housing adapted to be connected to a driving member to be rotated thereby; a substantially cylindrical drum turnably mounted for free rotation about its axis in said housing and being adapted to be connected to a driven member, said drum having an inner cylindrical clutch face; a pair of substantially semicircular clutch members located next to each other within said drum and extending substantially about the axis thereof, each of said clutch members having an outer clutch face directed toward said inner clutch face of said drum, and each clutch member extending in opposite directions from a central portion thereof respectively along different circular arcs smoothly merging into each other at said central portion and each having a radius substantially equal to the radius of said inner clutch face of said drum; a pair of links pivotally connected at one end to each of said clutch members respectively adjacent the opposite ends thereof and being of different lengths; and support means located in said housing, pivotally connecting the opposite ends of the shorter of said links to said housing for rotation therewith, so that said clutch members are suspended by said links from said support means for free movement under the action of centrifugal force into clutching engagement with said drum and a double armed lever turnably mounted for rotation about an axis co-axial with the axis of said drum pivotally supporting the opposite ends of the longer of said links and spring means resiliently biasing said double armed lever in a direction of rotation to move said clutch members through said longer links away from the inner clutch face of said drum.

10. Automatic clutch apparatus comprising, in combination, a substantially cylindrical hollow housing adapted to be connected, for rotation about its axis, to a driving member to be rotated thereby; a shaft having its axis coincident with the axis of said housing and being supported in the latter for free rotation, said shaft being adapted to be connected to a driven member; a substantially cylindrical drum having its center located in said shaft axis, being fixed to said shaft for rotation therewith, and being located within said housing, said drum having an inner cylindrical clutch face; a pair of substantially semicircular clutch members located next to each other within said drum and extending substantially about said shaft axis, each of said clutch members having an outer clutch face directed toward said inner clutch face of said drum, and each clutch member extending in opposite directions from a central portion thereof respectively along different circular arcs smoothly merging into each other at said central portion and each having a radius substantially equal to the radius of said inner clutch face of said drum; a two-armed lever turnably mounted at its center on said shaft for free rotation about the axis thereof, being located within said drum and housing, and having opposite free ends located adjacent said clutch members; a pair of links pivotally connected at one end to each of said clutch members respectively adjacent the opposite ends thereof and being of different lengths; first connecting means pivotally connecting the opposite end of the shorter of each pair of links to said housing for rotation therewith; second connecting means pivotally connecting the opposite ends of the longer links respectively to opposite end portions of said two-armed lever; and spring means operatively connected to said two-armed lever for urging the same in that direction about said shaft axis which draws said clutch members, through said longer links, away from said inner clutch face of said drum.

11. Automatic clutch apparatus comprising, in combination, a substantially cylindrical hollow housing adapted to be connected, for rotation about its axis, to a driving member to be rotated thereby; a shaft having its axis coincident with the axis of said housing and being supported in the latter for free rotation, said shaft being adapted to be connected to a driven member; a substantially cylindrical drum having its center located in said shaft axis, being fixed to said shaft for rotation therewith, and being located within said housing, said drum having an inner cylindrical clutch face; a pair of substantially semicircular clutch members located next to each other within said drum and extending substantially about said shaft axis, each clutch member having a T-shaped cross section, having an outer peripheral portion located substantially aong a cylinder extending about said shaft axis, and having an inner peripheral portion located in a plane normal to said shaft axis, and each clutch member having a slip-resistant lining fixed to said outer peripheral portion thereof and directed toward said inner clutch face of said drum; a two-armed lever turnably mounted at its center on said shaft for free rotation about the axis thereof, being located within said drum and housing, and having opposite free ends located adjacent said clutch members, said lever being formed in opposite side faces thereof with a first pair of recesses respectively located in the two arms of said lever; a pair of links pivotally connected at one end to each of said clutch members respectively adjacent the opposite ends thereof and being of different lengths; a pair of blocks fixed to said housing for rotation therewith, being located within said drum, and having outer peripheral portions formed with grooves into which said inner peripheral portions of said clutch members freely extend, respectively, said blocks being respectively formed with a second pair of recesses respectively directed toward said first pair of recesses; first connecting means pivotally connecting the opposite end of the shorter of each pair of links to said blocks, respectively; second connecting means pivotally connecting the opposite ends of the longer links respectively to opposite end portions of said two-armed lever; and spring means engaging said blocks and said two-armed lever for urging the latter in that direction about said shaft axis which draws said clutch members, through said longer links, away from said inner clutch face of said drum, said spring means comprising a pair of coil springs respectively located at one of the ends thereof respectively in said first pair of recesses and at the other of the ends thereof respectively in said second pair of recesses.

12. Automatic clutch apparatus comprising, in combination, a substantially cylindrical hollow housing adapted to be connected, for rotation about its axis, to a driving member to be rotated thereby; a shaft having its axis coincident with the axis of said housing and being supported in the latter for free rotation, said shaft being adapted to be connected to a driven member; a substantially cylindrical drum having its center located in said shaft axis, being fixed to said shaft for rotation therewith, and being located within said housing, said drum having an inner cylindrical clutch face; a pair of substantially semicircular clutch members located next to each other within said drum and extending substantially about said shaft axis, each clutch member having a T-shaped cross section, having an outer peripheral portion located substantially along a cylinder extending about said shaft axis, and having an inner peripheral portion located in a plane normal to said shaft axis, and each clutch member having a slip-resistant lining fixed to said outer peripheral portion thereof and directed toward said inner clutch face of said drum; a two-armed lever turnably mounted at its center on said shaft for free rotation about the axis thereof, being located within said drum and housing, and having opposite free ends located adjacent said clutch members, said lever being formed in opposite side faces thereof with a first pair of recesses respectively located in the two arms of said lever; a pair of links pivotally connected at one end to each of said clutch members respectively adjacent the opposite ends thereof and being of different lengths; a pair of blocks fixed to said housing for rotation therewith, being located within said drum, and having outer peripheral portions formed with grooves into which said inner peripheral portions of said clutch members freely extend, respectively, said blocks being respectively formed with a second pair of recesses respectively directed toward said first pair of recesses; first connecting means pivotally connecting the opposite end of the shorter of each pair of links to said blocks, respectively; second connecting means pivotally connecting the opposite ends of the longer links respectively to opposite end portions of said two-armed lever; spring means engaging said blocks and said two-armed lever for urging the latter in that direction about said shaft axis which draws said clutch members, through said longer links, away from said inner clutch face of said drum, said spring means comprising a pair of coil springs respectively located at one of the ends thereof respectively in said first pair of recesses and at the other of the ends thereof respectively in said second pair of recesses; and at least one disc located in one of said recesses and engaging the spring extending into the same to adjust the force of said spring.

13. An automatic clutch apparatus as defined in claim 7 and wherein said cylindrical housing includes a removable end plate fixed to and carrying said blocks so that end plate is removable from said housing together with said blocks, links, clutch members, and two-armed lever.

14. Automatic clutch apparatus comprsing, in combination, a substantially cylindrical hollow housing adapted to be connected, for rotation about its axis, to a driving member to be rotated thereby; a shaft having its axis coincident with the axis of said housing and being supported in the latter for free rotation, said shaft being adapted to be connected to a driven member; a substantially cylindrical drum having its center located in said shaft axis, being fixed to said shaft for rotation therewith, and being located within said housing, said drum having an inner cylindrical clutch face; a pair of substantially semicircular clutch members located next to each other within said drum and extending substantially about said shaft axis, each clutch member having a T-shaped cross section, having an outer peripheral portion located substantially along a cylinder extending about said shaft axis, and having an inner peripheral portion located in a plane normal to said shaft axis, and each clutch member having a slip-resistant lining fixed to said outer peripheral portion thereof and directed toward said inner clutch face of said drum; a two-armed lever turnably mounted at its center on said shaft for free rotation about the axis thereof, being located within said drum and housing, and having opposite free ends located adjacent said clutch members; a pair of links pivotally connected at one end to each of said clutch members respectively adjacent the opposite ends thereof and being of different lengths; a pair of blocks fixed to said housing for rotation therewith, being located within said drum, and having outer peripheral portions formed with grooves into which said inner peripheral portions of said clutch members freely extend, respectively; first connecting means pivotally connecting the opposite end of the shorter of each pair of links to said blocks, respectively; second connecting means pivotally connecting the opposite ends of the longer links respectively to opposite end portions of said two-armed lever; spring means engaging said blocks and said two-armed lever for urging the latter in that direction about said shaft axis which draws said clutch members, through said longer links, away from said inner clutch face of said drum; and damping means mounted on said blocks to engage said two-armed lever for damping the movement thereof under the influence of said spring means when said clutch is disengaged.

15. Automatic clutch apparatus as defined in claim 5 and wherein said housing and drum are formed with openings to direct cooling air through the apparatus.

16. Automatic clutch apparatus comprising a support member adapted to be connected to a driving member to be rotated thereby; a substantially cylindrical drum mounted for free rotation about its axis and adapted to be connected to a driven member, said drum defining an inner cylindrical clutch face; at least two arcuate clutch members located within said drum and extending substantially about the axis thereof, each of said clutch members having an outer clutch face directed toward said inner clutch face of said drum, a pair of links including a longer and a shorter link pivotally connected at opposite end portions of each said clutch members, means pivotally connecting the opposite ends of the shorter of said links to said support means for rotation therewith, means turnably mounted for rotation about the axis of said drum pivotally supporting the opposite ends of the longer of said links and means resiliently baising said means pivotally connected to the longer of said links for rotation in a direction which draws said clutch members through said longer links away from said inner clutch face of said drum.

17. Clutch according to claim 16, in which the links of each pair extend substantially parallel to each other.

18. Automatic clutch according to claim 16, in which said last-mentioned means comprises a double armed lever.

19. Automatic clutch according to claim 16, in which said support means comprises a substantially cylindrical hollow housing with said cylindrical drum mounted for free rotation about said axis in said housing.

References Cited in the file of this patent

UNITED STATES PATENTS

| | | |
|---|---|---|
| 1,587,410 | Pepin | June 1, 1926 |
| 2,513,798 | Hatfield | July 4, 1950 |
| 2,596,193 | Zieg | May 13, 1952 |

FOREIGN PATENTS

| | | |
|---|---|---|
| 43,414 | Germany | May 31, 1888 |
| 371,917 | Italy | June 9, 1939 |
| 831,243 | France | May 30, 1938 |